United States Patent
Raffa et al.

(10) Patent No.: US 9,746,941 B2
(45) Date of Patent: Aug. 29, 2017

(54) SENSORS-BASED AUTOMATIC RECONFIGURATION OF MULTIPLE SCREENS IN WEARABLE DEVICES AND FLEXIBLE DISPLAYS

(71) Applicant: Intel Corporation, Santa Clara, CA (US)

(72) Inventors: Giuseppe Raffa, Portland, OR (US); Deepak Vembar, Portland, OR (US); Glen J. Anderson, Beaverton, OR (US); Ryan Scott Brotman, Beaverton, OR (US); Jamie Sherman, Portland, OR (US); Francisco Javier Fernandez, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 120 days.

(21) Appl. No.: 14/368,734

(22) PCT Filed: Dec. 26, 2013

(86) PCT No.: PCT/US2013/077761
§ 371 (c)(1),
(2) Date: Jun. 25, 2014

(87) PCT Pub. No.: WO2015/099723
PCT Pub. Date: Jul. 2, 2015

(65) Prior Publication Data
US 2015/0185874 A1 Jul. 2, 2015

(51) Int. Cl.
*G06F 3/0346* (2013.01)
*G06F 3/0487* (2013.01)
*G06F 1/16* (2006.01)

(52) U.S. Cl.
CPC ............ *G06F 3/0346* (2013.01); *G06F 1/163* (2013.01); *G06F 1/1694* (2013.01); *G06F 3/0487* (2013.01); *G06F 2200/1637* (2013.01)

(58) Field of Classification Search
CPC .................. G06F 1/1694; G06F 1/163; G06F 2200/1637; G06F 3/0487; G06F 3/0346; G06F 3/013; G06F 3/015
See application file for complete search history.

(56) References Cited

U.S. PATENT DOCUMENTS

2007/0279852 A1 12/2007 Daniel et al.
2010/0321275 A1* 12/2010 Hinckley .............. G06F 1/1618
                                                                   345/1.3

(Continued)

FOREIGN PATENT DOCUMENTS

WO    WO-2015099723 A1    7/2015

OTHER PUBLICATIONS

"International Application Serial No. PCT/US2013/077761, International Preliminary Report on Patentability mailed Jul. 7, 2016", 11 pgs.

(Continued)

*Primary Examiner* — Vijay Shankar
*Assistant Examiner* — Abhishek Sarma
(74) *Attorney, Agent, or Firm* — Schwegman Lundberg & Woessner, P.A.

(57) ABSTRACT

Embodiments for providing a wearable device are generally described herein. A wearable device may include a processor having memory and communicatively coupled to a plurality of display areas; and an orientation sensing module communicatively coupled to the processor to determine at least one of an orientation and a location of at least one of the plurality of display areas with respect to a point of view of a user; wherein the processor provides a function for at least (Continued)

one of the plurality of display areas based on the determined at least one of the orientation and the location of at least one of the plurality of display areas by the orientation sensing module.

22 Claims, 4 Drawing Sheets

(56) References Cited

U.S. PATENT DOCUMENTS

| | | | |
|---|---|---|---|
| 2012/0146891 A1* | 6/2012 | Kalinli | H04N 19/33 |
| | | | 345/156 |
| 2012/0293410 A1 | 11/2012 | Bell | |
| 2012/0319940 A1 | 12/2012 | Bress et al. | |
| 2013/0044215 A1 | 2/2013 | Rothkopf et al. | |
| 2013/0222270 A1* | 8/2013 | Winkler | H04M 1/0233 |
| | | | 345/173 |
| 2013/0271350 A1* | 10/2013 | Lyons | G04G 17/083 |
| | | | 345/1.1 |
| 2014/0250447 A1* | 9/2014 | Schink | H04N 21/44218 |
| | | | 725/10 |
| 2014/0344608 A1* | 11/2014 | Wang | G06F 1/3287 |
| | | | 713/324 |

OTHER PUBLICATIONS

"International Application Serial No. PCT/US2013/077761, International Search Report mailed Sep. 26, 2014", 4 pgs.
"International Application Serial No. PCT/US2013/077761, Written Opinion mailed Sep. 26, 2014", 9 pgs.

\* cited by examiner

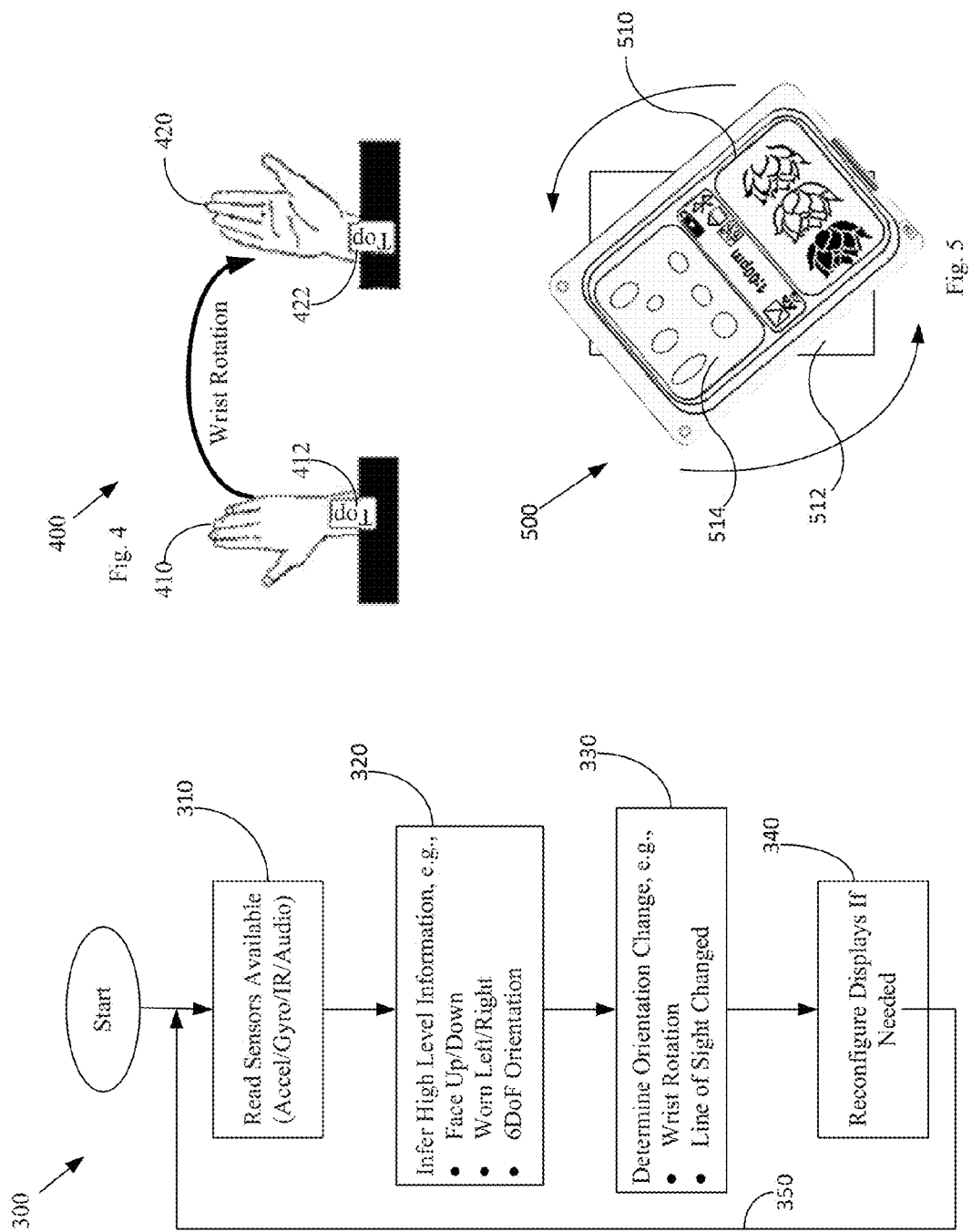

SENSORS-BASED AUTOMATIC RECONFIGURATION OF MULTIPLE SCREENS IN WEARABLE DEVICES AND FLEXIBLE DISPLAYS

This application is a U.S. National Stage Filing under 35 U.S.C. §371 from International Patent Application Serial No. PCT/US2013/077761, filed on Dec. 26, 2013, the benefit of priority of which is claimed hereby, and is incorporated by reference herein in its entirety.

BACKGROUND

Portable electronic devices, including but not limited to mobile phones, personal digital assistances (PDAs), etc., are frequently used for communication. For example, such electronic devices are used for direct communication and communication over a network, such as a telecommunication network. However, the use of portable electronic devices is not limited strictly to communication, as such devices can also be used for sharing data, listening music, watching stored videos, watching active contents/live contents and the like. Furthermore, data can be shared between two electronic devices through a telecommunication network, a short range wireless communication network and the like. For example, a mobile phone can share data file with another electronic device through short range wireless communication, for example, short range radio (Bluetooth®), infrared light (IR) and Near Field Communication (NFC).

While portable electronic devices are pervasive, wearable devices are posed to be a disruptive technology. Wearable devices are beginning to emerge that make use of curved/flexible displays that wrap the device on the wrist, and/or make use of multiple physical display areas. As such, more companies are looking to leverage wearable technology to perform multiple functions such as showing utility functionalities, notifications, fashion patterns and even social advertising.

In those types of devices there is the opportunity to display several kinds of content and notifications. In previous solutions using both virtual and physical display areas, content is placed on each display area using static rules, i.e., one portion is assigned to notifications whereas another to display the time. These aspects lead to problems with novel form factor devices with flexible displays and for devices that can be worn in different orientations, or those devices where position/orientation is not fixed, e.g., devices that can rotate on the wrist, or can be worn on the left/right wrist. For example, messages calling for user attention may be not displayed if the user is not able to view the notification panel that is configured for a particular location on the wrap around display.

BRIEF DESCRIPTION OF THE DRAWINGS

FIG. 3 is a flowchart of a setup method for a wearable device according to an embodiment;

FIG. 4 shows wrist rotation and display according to an embodiment;

FIG. 5 shows a mounting arrangement for the wearable device according to an embodiment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass available equivalents of those claims.

Embodiments described herein provide multiple, e.g., logical and/or physical, display areas, that may be used differently and assigned a different function in real time depending on the instantaneous location and/or orientation of the specific display area with respect to the user point of view. Embodiments that include multiple display areas that provide functions that may be arranged by the user overcome the deficiencies of static rules that are hard to manage and change in real time, limited form factors and lack of position and/or orientation defined functions.

Figure 1:
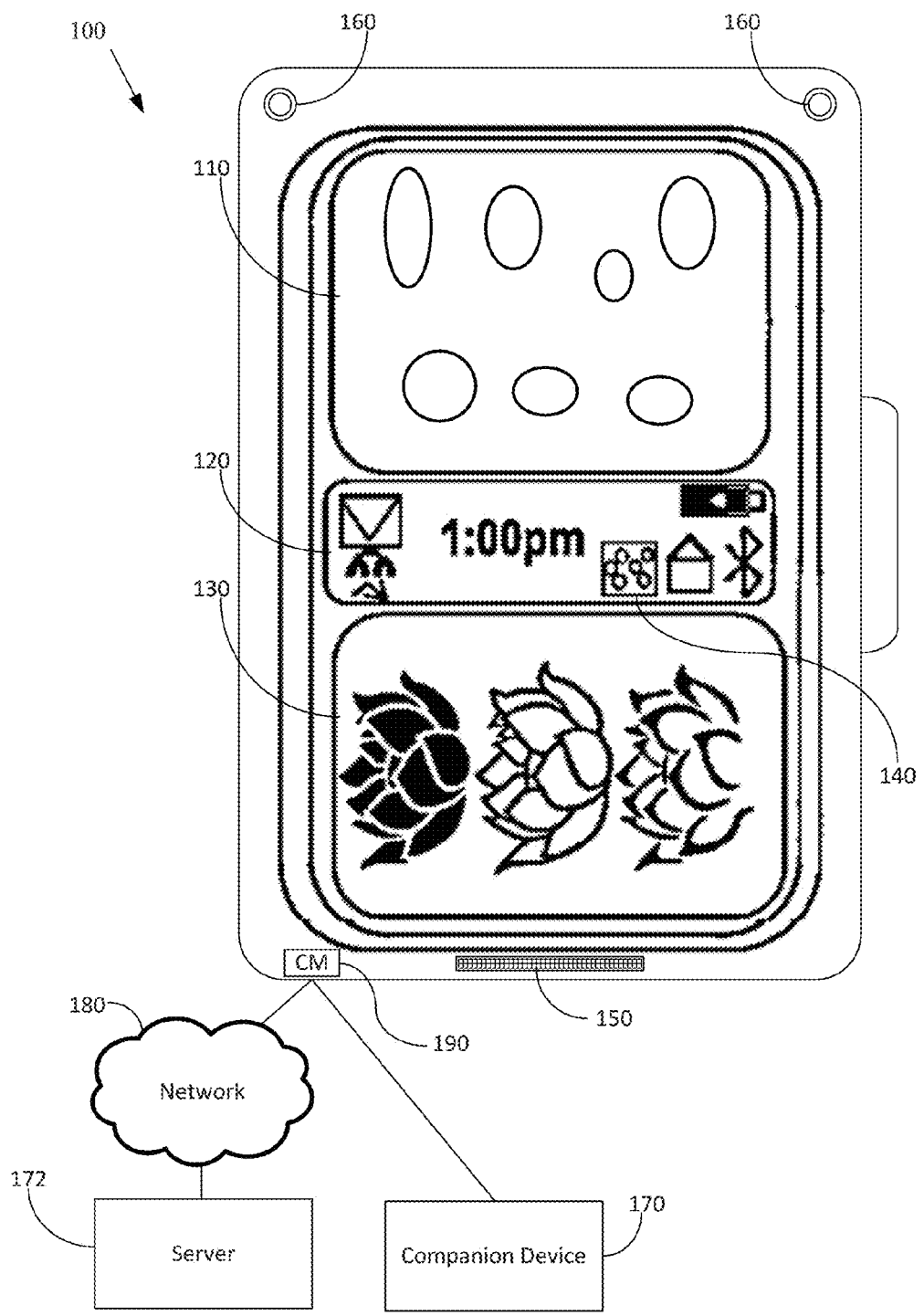
FIG. 1 illustrates a wearable device according to an embodiment.

FIG. 1 illustrates a wearable device 100 according to an embodiment. A wearable device may include not only smart watches, but also clothing, image projecting apparel, heart monitoring jewelry, smartphone-connected eyewear and other accessories that incorporate computer and advanced electronic technologies. In FIG. 1, the wearable device 100 includes multiple display areas 110, 120, 130. In FIG. 1, the wearable device 100 includes a peripheral display area 110, a top display area 120 and a bottom display area 130. The peripheral display area 110 may provide location-based notifications, such as reminders, to do lists, schedules, etc. The location-based notifications of the peripheral display area 110 may also present shared content. The top display area 120 may be used to present urgent notifications and the main functions of the wearable device 100. The bottom display area 130 may be a virtual display area and may be used, for example, to present selected content, such as fashion patterns, sports logos, images, etc. In other words, a virtual display area is a display area where user defined or selected content may be shown.

Each display area 110, 120, 130 of the wearable device may change function and shrink/grow according to orientation and line of sight of a user. The multiple display areas 110, 120, 130 allow different data content to be split into regions and assigned to locations of the multiple display area 110, 120, 130 across, for example, a curved wrap-around display to allow the user to access priority information at a glance.

From a usage point of view, the wearable device 100 may enable the user to have the more urgent/personal/important notifications and content visible at a glance in the top display area 120, while enabling freedom to reconfigure and/or wear the device in different ways. The flexibility may allow different form factors to be implemented, without the limitation of having one static function assigned to each display area 110, 120, 130, or even to a particular portion of the display areas 110, 120, 130.

When the user is in close proximity with other people, the wearable device 100 may be arranged such that only public data is displayed on the device, while private data will be hidden. The user may approve or deny presentation of private data via a user interface (UI), e.g., tapping an icon 140. For example, an icon may be presented on a display area for changing a function associated with a display area. Determining when multiple people are in close proximity to the user's bracelet may be achieved by using, for example, speech recognition (of multiple people) with the microphone 150 on-board or multiple IR sensors or wide angle cameras 160, each one on a different section of the curved device. A portion of the processing may be offloaded to a companion device 170 or to a server 172 via a network 180. The private data, if enabled by the user, can be displayed on the part of the bracelet closer to the user point of view, i.e. the inner side of the wrist.

When one of the display areas, for example bottom display area 130, is arranged as a virtual display area, the dimensions of each display area 110, 120, 130 may also be changed depending on the notification or content being displayed, not only statically, but depending again on the orientation of the device. For example, the top display area 120 can grow on the side that is more "in line of sight" with the user. Content, e.g., from a content producing device, e.g., the wearable device itself or a remote device, such as a smartphone, may be labeled in different classes and assigned a priority. Accordingly, such classified content may be selectively assigned to a specific display area.

To save power, when one or more of the display areas 110, 120, 130 are not in direct line of sight, one or more of the display areas 110, 120, 130 may be turned off, e.g., when a low battery state is detected, to improve the user experience or save on battery power. When an orientation change is detected, the powered on display can change accordingly because the main display may be active for more time. Some user explicit mechanisms may be used to temporarily stop the automatic reconfiguration of display areas, e.g., touching one of the display areas 110, 120, 130 on the wearable device 100 may be arranged to mean to not reconfigure the display areas. For example, automatic reconfiguration may be temporarily stopped when the user wants to look at the bottom display area 130, which may be set to not usually be visible. A communication module 190 communicates with one of a companion device 170 of the user or a server 172 via a network 180, wherein the wearable device 100 offloads processing to the companion device 170 or the server 172 using the communication module 190.

Figure 2:
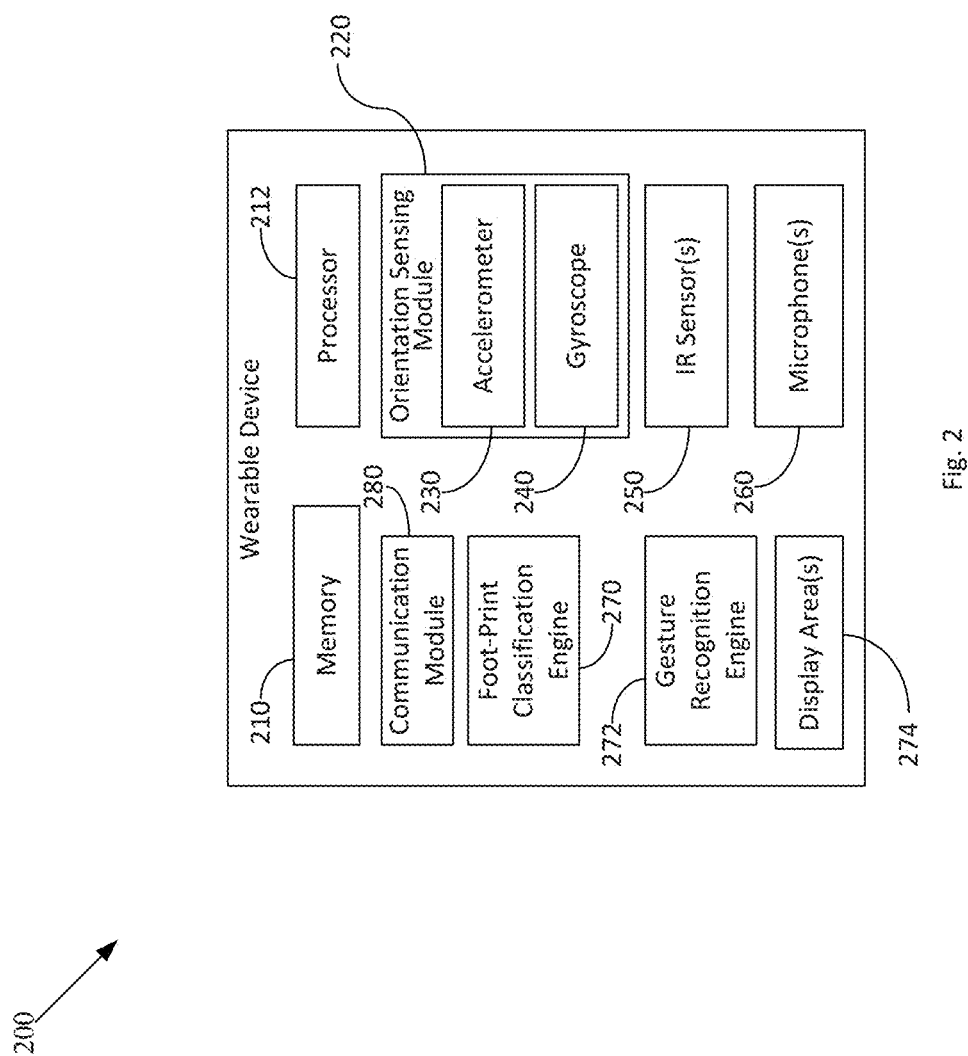
FIG. 2 is a functional block diagram of a wearable device according to an embodiment.

FIG. 2 is a functional block diagram of a wearable device 200 according to an embodiment. The wearable device 200 includes memory 210 for storing data and a processor 212. The wearable device 200 may include an orientation sensing module, which may include an accelerometer 230 and gyroscope 240, for determining six degrees of freedom (6DoF) orientation (yaw, pitch, roll), wherein the accelerometer 230 may also provide face up/down discrimination. At least one IR sensor 250 may be used for determining when a display area 274 is facing the user face. This functionality is similar to smartphones that turn off the display area when the device is close to the face. The processor 212 of the wearable device 200 may monitor interactions of the user with the system and identify previous explicit interactions of the user, e.g., the user dragged content to one particular display area (the "bottom" one) several times. Multiple microphones 260 may be implemented to determine user relative position based on audio signals. The microphones 260 may be used, for example, to determine if the device is worn on the left or right wrist. Gesture recognition engine 272 may uses signals from orientation sensing module 220, including the accelerometer 230 and gyroscope 240, to determine when the user performs a rotation gesture. Gesture recognition engine 272 may be a software engine running on the processor 212 that allows the wearable device 200 to detect and interpret user-generated gestures, such as hand gestures or movement of the user's arm or other part of the user's body, for motion-enabled functionality. A lightweight foot-print classification engine 270 running on the processor may be employed, e.g., a simple decision tree, to determine the state of each display area, wherein the processor may then assign a specific function in real time based on the determined state of each display area.

The processor 212 may monitor a position of display areas and their 3D orientation in space by using sensing technologies, e.g., orientation sensing module 220, including accelerometer 230 and gyroscope 240. The processor 212 may also monitor a state of each display area using the lightweight foot-print classification engine 270. Depending on the information gathered by the processor 212, the system can infer the "state" of each display area. For example, a display area function may be presented at the bottom, top, or peripheral display area based on the orientation of the wearable device 200 and the location and viewing angle of the user. Different functions can be assigned to the display areas, e.g., respectively shared content/designs", urgent and personal notifications, reminders and location-based notifications, etc. based on the detected relative orientations. If" the device orientation changes significantly, the function of each display area may be reassigned so that, for example, the urgent notifications would be in the line of sight of the user.

For more powerful systems/processor 212 implemented in the wearable devices, more complex algorithms may be potentially used that take into account the previous user interaction and other contextual elements, such as people nearby to determine appropriateness to have displays in a shared state, or even providing content targeted to the person nearby. Also, the contextual state of the person, for example as inferred by the processor 212 using the various sensors on the wearable device 200, on an ensemble of devices or on a smartphone or other devices, may be utilized by the processor 212 to determine the characteristics of the display areas. A communication module 280 provides communication, such as with a companion device or a server via a network. The processor 212 may offload processing to the companion device or the server using the communication module.

FIG. 3 is a flowchart of a setup method 300 for a wearable device according to an embodiment. The setup method 300 may be used for determining orientation changes and setting up displays. FIG. 4 shows wrist rotation and display 400 according to an embodiment. When the palm is facing down and the back of the hand 410 is visible to the user, the display may be presented on a first side 412. When the palm 420 is facing up and is visible to the user, the display may be presented on a second side 422. FIG. 5 shows a mounting arrangement 500 for the wearable device according to an embodiment. In FIG. 5, the wearable device 510 is coupled to an adjustable fastener 512 that allows the plurality of display areas 514 on the wearable device 510 to be arranged in a first alignment on the user and to allow the plurality of display areas to be changed to a second alignment. Other designs may be implemented without departing from this description of an adjustable fastener. Referring again to FIG. 3, the system reads the available sensors 310. The available sensors may include an accelerometer, a gyroscope, IR sensors, audio sensors, etc. High level information is inferred 320. High level information may include whether the wearable device if oriented face up or face down, whether the device in on the left wrist or right list, whether six degrees of freedom (6DoF) orientation is detected, etc.

An orientation change is detected 330. For example, wrist rotation and/or line of sight may change. The display is reconfigured when orientation is determined to have changed and/or when setting up displays 340. The method then returns to repeat the process 350.

Figure 6:
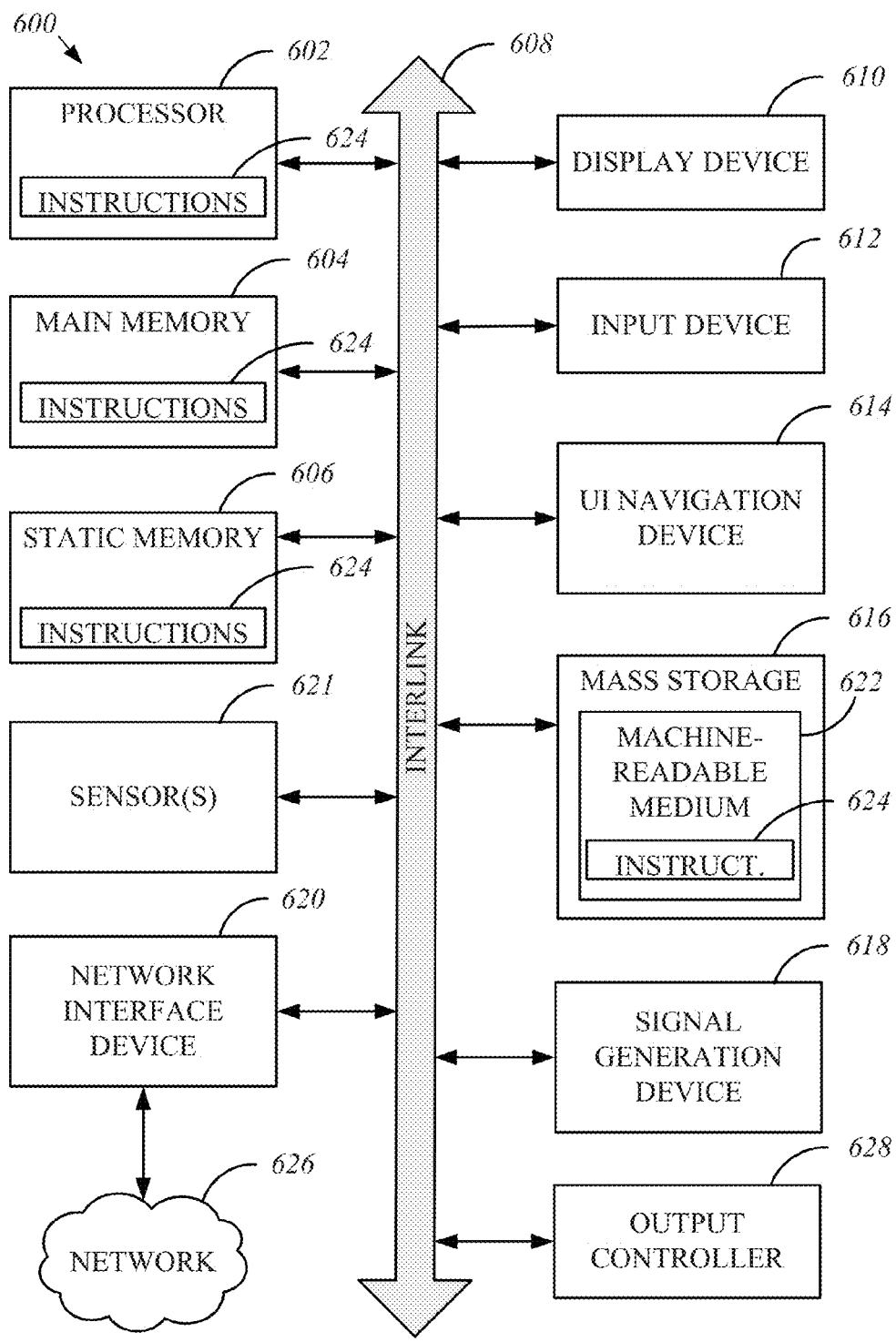
FIG. 6 illustrates a block diagram of an example machine for providing sensors-based automatic reconfiguration of multiple display areas in wearable devices and flexible displays according to an embodiment

FIG. 6 illustrates a block diagram of an example machine 600 for providing sensors-based automatic reconfiguration of multiple display areas in wearable devices and flexible displays according to an embodiment upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine and/or a client machine in server-client network environments. In an example, the machine 600 may act as a peer machine in peer-to-peer (P2P) (or other distributed) network environment. The machine 600 may be a personal computer (PC), a tablet PC, wearable technology, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 602 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations. For example, under operation, the execution units may be configured by a first set of instructions to implement a first module at one point in time and reconfigured by a second set of instructions to implement a second module.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 602 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 600 may include a hardware processor 602 (e.g., a central processing unit (CPU), a graphics processing unit (GPU), a hardware processor core, or any combination thereof), a main memory 604 and a static memory 606, at least some of which may communicate with others via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch display surface area. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR)) connection to communicate or control one or more peripheral devices (e.g., a printer, card reader, etc.).

The storage device 616 may include at least one machine readable medium 622 on which is stored one or more sets of data structures or instructions 624 (e.g., software) embodying or utilized by any one or more of the techniques or functions described herein. The instructions 624 may also reside, at least partially, additional machine readable memories such as main memory 604, static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) that configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and compact disk-read-only memory (CD-ROM) and digital video disk read-only memory (DVD-ROM) disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

ADDITIONAL NOTES AND EXAMPLES

Example 1 includes subject matter (such as a device, apparatus, client or system) for a wearable device, including a processor having memory and communicatively coupled to a plurality of display areas and an orientation sensing module communicatively coupled to the processor to determine at least one of an orientation and a location of at least one of the plurality of display areas with respect to a point of view of a user, wherein the processor provides a function for at least one of the plurality of display areas based on the determined at least one of the orientation and the location of at least one of the plurality of display areas by the orientation sensing module.

In Example 2 the subject matter of Example 1 may optionally include, wherein the plurality of display areas comprises a peripheral display area, a top display area and a bottom display area, wherein the peripheral display area is arranged to present location-based notifications, the top display area is arranged to present urgent notifications and primary functions of the wearable device, and the bottom display area is arranged to provide a display for presenting selected content.

In Example 3 the subject matter of any one or more of Examples 1-2 may optionally include, wherein the selected content comprises at least one selected from a group consisting of fashion patterns, sports logos and images.

In Example 4 the subject matter of any one or more of Examples 1-3 may optionally include, wherein the processor is arranged to change a function associated with at least one of the plurality of display areas based on a change in the determined at least one of the orientation and the location of at least one of the plurality of display areas by the orientation sensing module.

In Example 5 the subject matter of any one or more of Examples 1-4 may optionally further include an adjustable fastener, the adjustable fastener arranged to set the plurality of display areas in a first alignment on the user and to change the plurality of display areas to a second alignment.

In Example 6 the subject matter of any one or more of Examples 1-5 may optionally further include a sensor for providing sensed signals to the processor for control of the plurality of display areas, wherein the sensor comprises at least one selected from a group consisting of an accelerometer, a gyroscope, a microphone, an infrared (IR) sensor, and a camera.

In Example 7 the subject matter of any one or more of Examples 1-6 may optionally include, wherein the sensor is further arranged to detect when another person is in close proximity to the sensor, the processor arranged to change the plurality of display areas from displaying private content to displaying public content.

In Example 8 the subject matter of any one or more of Examples 1-7 may optionally include, wherein the processor is further arranged to present an icon on at least one of the plurality of display areas, the icon being selectable by touch of the at least one of the plurality of display areas by the user to cause the processor to change the function associated with at least one of the plurality of display areas.

In Example 9 the subject matter of any one or more of Examples 1-8 may optionally further include a communication module for communicating with one of a companion device of the user or a server via a network, wherein the processor is further arranged to offload processing to the companion device or the server using the communication module.

In Example 10 the subject matter of any one or more of Examples 1-9 may optionally include, wherein the processor is further arranged to assign a priority to predetermined content for display on one of the plurality of display areas, to determine when the device is worn on the left or right wrist based on the determined at least one of the orientation and the location of at least one of the plurality of display areas by the orientation sensing module and to determine a contextual state of a person using the sensors.

In Example 11 the subject matter of any one or more of Examples 1-10 may optionally include, wherein the processor selects one of the top display area, the bottom display area and the peripheral display area for presenting a function based on the determined orientation or location by the orientation sensing module and assigns presentation of urgent notifications to one of the plurality of display areas identified by the processor to be in the line of sight of the user based on the determined orientation or location by the orientation sensing module.

In Example 12 the subject matter of any one or more of Examples 1-11 may optionally further include a gesture recognition engine arranged to process accelerometer and gyroscope signals to determine rotation gestures and a foot-print classification engine to determine the state of each of the plurality of display areas and assigning a predetermined function to one of the plurality of display areas based on the determined state.

Example 13 may include subject matter (such as a method or means for performing acts) including providing a plurality of display areas on a wearable electronic device arranged to present content to a user thereon, determining, by an orientation sensing module, at least one of an orientation and a location of at least one of the plurality of display areas with respect to a sensed point of view of the user and providing, by a processor, a function for each of the plurality of display areas based on the determined at least one of the orientation and the location of at least one of the plurality of display areas of the wearable electronic device by the orientation sensing module.

In Example 14 the subject matter of Example 13 may optionally include, wherein the presenting content to the user on the plurality of display areas further comprises presenting location-based notifications on a peripheral display area selected from the plurality of display areas, present urgent notifications and primary functions on a top display area selected from the plurality of display areas, and providing a virtual display area on the bottom display area selected from the plurality of display areas for presenting selected content.

In Example 15 the subject matter of any one or more of Examples 13-14 may optionally further include changing a function associated with each of the plurality of display areas based on a change in the determined at least one of the orientation and the location of at least one of the plurality of display areas by the orientation sensing module, and presenting content to regions assigned to locations on the plurality of display areas.

In Example 16 the subject matter of any one or more of Examples 13-15 may optionally further include sensing signals using at least one sensor of the orientation sensing module and providing the sensed signals to the processor for controlling the plurality of display areas, and, based on the sensed signals provided to the processor, determining six degrees of freedom (6DoF) orientation, providing face up/down discrimination and determining when the display area is facing the user face.

In Example 17 the subject matter of any one or more of Examples 13-16 may optionally further include detecting when another person is in close proximity to the at least one sensor and changing the plurality of display areas from displaying private content to displaying public content.

In Example 18 the subject matter of any one or more of Examples 13-17 may optionally further include providing an icon on at least one of the plurality of display areas, selecting the icon by the user to change the function associated with at least one of the plurality of display areas.

In Example 19 the subject matter of any one or more of Examples 13-18 may optionally further include communicating, using a communication module, with one of a companion device of the user or a server via a network and offloading processing to the companion device or the server.

In Example 20 the subject matter of any one or more of Examples 13-19 may optionally further include changing a dimension of at least one of the plurality of display areas and assigning a priority to predetermined content for display on one of the plurality of display areas.

In Example 21 the subject matter of any one or more of Examples 13-20 may optionally further include turning off at least one of the plurality of display areas when a low battery state is detected.

In Example 22 the subject matter of any one or more of Examples 13-21 may optionally further include determining when the device is worn on the left or right wrist based on the determined at least one of the orientation and the location of at least one of the plurality of display areas by the orientation sensing module and determining a contextual state of a person using the sensors.

In Example 23 the subject matter of any one or more of Examples 13-22 may optionally include, wherein the providing a function for each of the plurality of display areas based on the determined at least one of the orientation and the location of at least one of the plurality of display areas by the orientation sensing module further comprises assigning presentation of urgent notifications to one of the plurality of display areas identified by the processor to be in the line of sight of the user based on the determined orientation or location by the orientation sensing module.

Example 24 may include subject matter (such as means for performing acts or machine readable medium including instructions that, when executed by the machine, cause the machine to perform acts) including providing a plurality of display areas on a wearable electronic device arranged to present content to a user thereon, determining, by an orientation sensing module, at least one of an orientation and a location of at least one of the plurality of display areas with respect to a sensed point of view of the user and providing, by a processor, a function for each of the plurality of display areas based on the determined at least one of the orientation and the location of at least one of the plurality of display areas of the wearable electronic device by the orientation sensing module.

In Example 25 the subject matter of Example 24 may optionally include, wherein the presenting content to the user on the plurality of display areas further comprises presenting location-based notifications on a peripheral display area selected from the plurality of display areas, present urgent notifications and primary functions on a top display area selected from the plurality of display areas, and providing a virtual display area on the bottom display area selected from the plurality of display areas for presenting selected content.

In Example 26 the subject matter of any one or more of Examples 26-25 may optionally further include changing a function associated with each of the plurality of display areas based on a change in the determined at least one of the orientation and the location of at least one of the plurality of display areas by the orientation sensing module, and presenting content to regions assigned to locations on the plurality of display areas.

In Example 27 the subject matter of any one or more of Examples 26-26 may optionally further include sensing signals using at least one sensor of the orientation sensing module and providing the sensed signals to the processor for controlling the plurality of display areas, and, based on the sensed signals provided to the processor, determining six degrees of freedom (6DoF) orientation, providing face up/down discrimination and determining when the display area is facing the user face.

In Example 28 the subject matter of any one or more of Examples 26-27 may optionally further include detecting when another person is in close proximity to the at least one sensor and changing the plurality of display areas from displaying private content to displaying public content.

In Example 29 the subject matter of any one or more of Examples 26-28 may optionally further include providing an icon on at least one of the plurality of display areas, selecting the icon by the user to change the function associated with at least one of the plurality of display areas.

In Example 30 the subject matter of any one or more of Examples 26-29 may optionally further include communicating, using a communication module, with one of a companion device of the user or a server via a network and offloading processing to the companion device or the server.

In Example 31 the subject matter of any one or more of Examples 26-30 may optionally further include changing a dimension of at least one of the plurality of display areas and assigning a priority to predetermined content for display on one of the plurality of display areas.

In Example 32 the subject matter of any one or more of Examples 26-31 may optionally further include turning off at least one of the plurality of display areas when a low battery state is detected.

In Example 33 the subject matter of any one or more of Examples 26-32 may optionally further include determining when the device is worn on the left or right wrist based on the determined at least one of the orientation and the location of at least one of the plurality of display areas by the orientation sensing module and determining a contextual state of a person using the sensors.

In Example 34 the subject matter of any one or more of Examples 26-33 may optionally include, wherein the providing a function for each of the plurality of display areas based on the determined at least one of the orientation and the location of at least one of the plurality of display areas by the orientation sensing module further comprises assigning presentation of urgent notifications to one of the plurality of display areas identified by the processor to be in the line of sight of the user based on the determined orientation or location by the orientation sensing module.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A wearable device, comprising:
   a processor having memory and communicatively coupled to a plurality of display areas;
   a sensor for providing sensed signals to the processor for control of the plurality of display areas, wherein the sensor comprises at least one of an accelerometer, a gyroscope, a microphone, an infrared (IR) sensor, or a camera; and
   an orientation sensing module communicatively coupled to the processor to determine at least one of an orientation and a location of at least one of the plurality of display areas with respect to a point of view of a user;
   wherein the processor provides a function for at least one of the plurality of display areas, based at least in part on the determined at least one of the orientation and the location of at least one of the plurality of display areas by the orientation sensing module;
   wherein the processor also displays a private data approval icon on at least one of the plurality of displays;
   wherein the processor also receives a touch signal from the at least one of the plurality of displays indicating that the user has tapped the private data approval icon to approve private data display;
   wherein the processor also displays a first item of private data;
   wherein the processor also determines that at least two people are in proximity to the wearable device based at least in part on the sensed signals provided by the sensor, and changes the at least one of the plurality of display areas to remove the first item of private data; and
   wherein the processor also determines that a first display area is in a line of sight of the user, and enlarges the first display area.

2. The wearable device of claim 1, wherein the plurality of display areas comprises a peripheral display area, a top display area and a bottom display area, wherein the peripheral display is arranged to present location-based notifications, the top display is arranged to present urgent notifications and primary functions of the wearable device, and the bottom display area is arranged to provide a display for presenting selected content, and wherein at least one of the peripheral display, the top display area, or the bottom display area comprises the first display area.

3. The wearable device of claim 2, wherein the selected content comprises at least one selected from a group consisting of fashion patterns, sports logos and images.

4. The wearable device of claim 1, wherein the processor is arranged to change a function associated with at least one of the plurality of display areas based on a change in the determined at least one of the orientation and the location of at least one of the plurality of display areas by the orientation sensing module.

5. The wearable device of claim 1 further comprising an adjustable fastener, the adjustable fastener arranged to set the plurality of display areas in a first alignment on the user and to change the plurality of display areas to a second alignment.

6. The wearable device of claim 1, wherein the processor is further arranged to present an icon on at least one of the plurality of display areas, the icon being selectable by touch of the at least one of the plurality of display areas by the user to cause the processor to change the function associated with at least one of the plurality of display areas.

7. The wearable device of claim 1 further comprising a communication module for communicating with one of a companion device of the user or a server via a network, wherein the processor is further arranged to offload processing to the companion device or the server using the communication module.

8. The wearable device of claim 1, wherein the processor is further arranged to assign a priority to predetermined content for display on one of the plurality of display areas, to determine when the device is worn on a left or right wrist based on the determined at least one of the orientation and the location of at least one of the plurality of display areas by the orientation sensing module and to determine a contextual state of a person using the sensors.

9. The wearable device of claim 2, wherein the processor selects one of the top display area, the bottom display area and the peripheral display area for presenting a function based on the determined orientation or location by the orientation sensing module and assigns presentation of urgent notifications to one of the plurality of display areas identified by the processor to be in line of sight of the user based on the determined orientation or location by the orientation sensing module.

10. The wearable device of claim 1 further comprising a gesture recognition engine arranged to process accelerometer and gyroscope signals to determine rotation gestures and a foot-print classification engine to determine a state of each of the plurality of display areas and assigning a predetermined function to one of the plurality of display areas based on the determined state.

11. A method for providing sensors-based automatic reconfiguration of multiple display areas in wearable devices, comprising:
provinding a plurality of display areas on a wearable electronic device arranged to present content to a user thereon;
determining, by an orientation sensing module, at least one of an orientation and a location of at least one of the plurality of display areas with respect to a sensed point of view of the user; and
providing, by a processor, a function for each of the plurality of display areas based on the determined at least one of the orientation and the location of at least one of the plurality of display areas of the wearable electronic device by the orientation sensing module;
receiving, by the processor and from a sensor, a sensed signal for control of the plurality of display areas, wherein the sensor comprises at least one of an accelerometer, a gyroscope, a microphone, an infrared (JR) sensor, or a camera;
displaying, by the processor a private data approval icon on at least one of the plurality of displays;
receiving, by the processor, a touch signal from the at least one of the plurality of displays indicating that the user has tapped the private data approval icon to approve private data display;
displaying, by the processor, a first item of private data;
determining, by the processor, that at least two people are in proximity to the wearable device based at least in part on the sensed signal;
changing, by the processor, at least one of the plurality of display areas to remove the first item of private data;
determining, by the processor that a first display area is in a line of sight of the user; and
enlarging the first display area.

12. The method of claim 11, wherein the presenting content to the user on the plurality of display areas further comprises presenting location-based notifications on a peripheral display area selected from the plurality of display areas, present urgent notifications and primary functions on a top display area selected from the plurality of display areas, and providing a virtual display area on a bottom display area selected from the plurality of display areas for presenting selected content, and wherein at least one of the peripheral display, the top display area, or the bottom display area comprises the first display area.

13. The method of claim 11 further comprising changing a function associated with each of the plurality of display areas based on a change in the determined at least one of the orientation and the location of at least one of the plurality of display areas by the orientation sensing module, and presenting content to regions assigned to locations on the plurality of display areas.

14. The method of claim 11 further comprising sensing signals using at least one sensor of the orientation sensing module and providing the sensed signals to the processor for controlling the plurality of display areas, and, based on the sensed signals provided to the processor, determining six degrees of freedom (6DoF) orientation, providing face up/down discrimination and determining when the display area is facing a user face.

15. The method of claim 11 further comprising providing an icon on at least one of the plurality of display areas, selecting the icon by the user to change the function associated with at least one of the plurality of display areas.

16. The method of claim 11 further comprising communicating, using a communication module, with one of a companion device of the user or a server via a network and offloading processing to the companion device or the server.

17. The method of claim 11 further comprising changing a dimension of at least one of the plurality of display areas and assigning a priority to predetermined content for display on one of the plurality of display areas.

18. The method of claim 11 further comprising turning off at least one of the plurality of display areas when a low battery state is detected.

19. The method of claim 11 further comprising determining when the device is worn on a left or right wrist based on the determined at least one of the orientation and the location of at least one of the plurality of display areas by the orientation sensing module and determining a contextual state of a person using the sensors.

20. The method of claim 11, wherein the providing a function for each of the plurality of display areas based on the determined at least one of the orientation and the location of at least one of the plurality of display areas by the orientation sensing module further comprises assigning presentation of urgent notifications to one of the plurality of display areas identified by the processor to be in a line of sight of the user based on the determined orientation or location by the orientation sensing module.

21. At least one non-transitory machine readable medium comprising instructions that, when executed by the machine, cause the machine to perform operations for providing sensors-based automatic reconfiguration of multiple display areas in wearable devices, the operations comprising:
- providing a plurality of display areas on a wearable electronic device arrange to present content to a user thereon;
- determining, by an orientation sensing module, at least one of an orientation and a location of at least one of the plurality of display areas with respect to a sensed point of view of the user; and
- providing, by a processor, a function for each of the plurality of display areas based on the determined at least one of the orientation and the location of at least one of the plurality of display areas of the wearable electronic device by the orientation sensing module;
- receiving, by the processor and from a sensor, a sensed signal for control of the plurality of display areas, wherein the sensor comprises at least one of an accelerometer, a gyroscope, a microphone, an infrared (IR) sensor, or a camera;
- displaying, by the processor, a private data approval icon on at least one of the plurality of displays;
- receiving, by the processor, a touch signal from the at least one of the plurality of displays indicating that the user has tapped the private data approval icon to approve private data display;
- displaying, by the processor, a first item of private data;
- determining, by the processor, that at least two people are in proximity to the wearable device based at least in part on the sensed signal;
- changing, by the processor, at least one of the plurality of display areas to remove the first item of private data;
- determining, by the processor that a first display area is in a line of sight of the user; and
- enlarging the first display area.

22. The at least one non-transitory machine readable medium of claim 21, wherein the presenting content to the user on the plurality of display areas further comprises presenting location-based notifications on a peripheral display area selected from the plurality of display areas, present urgent notifications and primary functions on a top display area selected from the plurality of display areas, and providing a virtual display area on a bottom display area selected from the plurality of display areas for presenting selected content, and wherein at least one of the peripheral display, the top display area, or the bottom display area comprises the first display area.

* * * * *